(12) United States Patent
Turk et al.

(10) Patent No.: US 8,311,751 B2
(45) Date of Patent: Nov. 13, 2012

(54) DEVICE FOR DETERMINING DEFORMATION IN A BEARING ROLLER

(75) Inventors: Raymond Turk, Eindhoven (NL); Hendrik Enting, Best (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 653 days.

(21) Appl. No.: 12/086,207

(22) PCT Filed: Dec. 8, 2006

(86) PCT No.: PCT/NL2006/000624
§ 371 (c)(1),
(2), (4) Date: Oct. 29, 2009

(87) PCT Pub. No.: WO2007/067045
PCT Pub. Date: Jun. 14, 2007

(65) Prior Publication Data
US 2010/0042341 A1  Feb. 18, 2010

(30) Foreign Application Priority Data
Dec. 9, 2005 (EP) .................................... 05077831

(51) Int. Cl.
*G01N 11/00* (2006.01)
(52) U.S. Cl. ......................................................... 702/56
(58) Field of Classification Search ...................... 702/56
See application file for complete search history.

(56) References Cited

U.S. PATENT DOCUMENTS

| | | | |
|---|---|---|---|
| 4,287,553 A | 9/1981 | Braunlich | 361/283 |
| 4,458,292 A | 7/1984 | Tward et al. | 361/283 |
| 5,181,423 A | 1/1993 | Philipps | 73/724 |
| 2004/0118209 A1 | 6/2004 | Mol et al. | |
| 2005/0040908 A1 | 2/2005 | Mazzochette et al. | |

FOREIGN PATENT DOCUMENTS

| | | |
|---|---|---|
| EP | 0 227 850 | 7/1987 |
| GB | 2 418 989 | 4/2006 |
| JP | 2000-304567 | 11/2000 |
| JP | 2005-037298 | 2/2005 |
| JP | 2006-071501 | 3/2006 |

OTHER PUBLICATIONS

IEEE Transactions on Electromagnetic Compatibility, vol. 46, No. 4, Nov. 2004, Electromagnetic Interference (EMI) Reduction From Printed Circuit Boards (PCB) Using Electromagnetic Bandgap Structures Shahrooz Shahparnia, Student Member, IEEE, and Omar M. Ramahi, Senior Member, IEEE, p. 580-587.*

* cited by examiner

*Primary Examiner* — Tung S Lau
(74) *Attorney, Agent, or Firm* — Banner & Witcoff, Ltd.

(57) ABSTRACT

Device for determining displacement, the device comprising at least two substantially parallel plates located at a distance from each other. The device is arranged to determine a displacement of at least two predetermined parts of each of the plates with respect to each other and the displacement are directed substantially perpendicular to a main surface of the plates, wherein the displacement is a result of bending of the plates. The device comprises at least one sensor for measuring the displacement.

29 Claims, 5 Drawing Sheets

DEVICE FOR DETERMINING DEFORMATION IN A BEARING ROLLER

The invention relates to a device for determining displacement.

Such a device is, for instance, known from European patent application EP-A-0637784 which discloses a device for measuring displacement in roller bearings, the displacement being a result of forces applied on the roller bearings, wherein the device is formed by a strain gauge transducer arranged to generate a signal indicative of forces applied on the bearings on the basis of a strain measured by the strain gauge transducer in its vicinity. The device communicates with means for the recording, processing and evaluation of signals emitted from the strain gauge transducers. These signals are relatable to the bearing load.

An important disadvantage of this known device is the fact the device has rather large dimensions, which means that the device cannot be used in narrow bores, and thus not for small bearing rollers.

Another disadvantage of the known device is that the device requires a large electrical current and therefore a large power consumption.

Yet another disadvantage of the device is the difficulty in compensating for temperature variations in the device.

The objective of the invention is to address at least one of the above-mentioned disadvantages.

This objective is achieved with a device according to the invention, the device comprising at least two substantially parallel plates located at a distance from each other, the device being arranged to determine a displacement of at least two predetermined parts of the plates with respect to each other, the displacement being directed substantially perpendicular to a main surface of the plates and the displacement being a result of bending of the plates, wherein the device comprises at least one sensor for measuring the displacement, wherein at least one of the plates is substantially formed by a printed circuit board.

Such a device may be introduced in a bore provided in a bearing roller. While in use, the displacement between the plates can be monitored using the sensor.

Surprisingly, printed circuit board plates, when used in a configuration as described above, prove to be a very suitable means for guiding displacements in a direction substantially perpendicular to the main surface of the plates. Generally, these printed circuit boards are not suitable for application in deforming bodies, because due to deformation cracks may appear in the material or an electrode or a component attached to the plate may come off. However, in a device according to the invention the deformation is usually so small, that the risk that cracks appear or that the electrode or component detaches from the plate, is negligible.

Herein, printed circuit board is to be understood as a printed circuit board of the type whereon usually electronic components are mounted and electronically connected by means of electronically conducting paths of the printed circuit board. This type of printed circuit board is a usually plate-shaped board which on at least one side thereof is substantially fully metalised, so that during the production of a desired printed circuit board a portion of the metalised layer may be removed, usually by etching, in order to form the desired circuit of metallic paths and/or shapes.

On the one hand, commercially available printed circuit boards may comprise an epoxy glass fibre reinforced laminate, preferably a flame retardant, such as flame retardant 4 (FR4), aluminum oxide, aluminum nitride, Rogers 4003, Rogers Duroid, a low temperature co-fired ceramic material (LTCC) and/or a high temperature co-fired ceramic material (HTCC). On the other hand a plate of glass, for instance quartz or a borosilicate glass, is not to be considered a printed circuit board in the sense of the invention. The use of a commercially available printed circuit board provides the advantage that the device for determining displacement may be produced at low cost.

More particularly the sensor for measuring the displacement is formed by a capacitor having at least two capacitor electrodes, each of the plates being provided with such a capacitor electrode, wherein the displacement between the plates is determinable on the basis of a change in the capacitance of the capacitor. A capacitor can have much smaller dimensions than the devices used in the prior art. Therefore, the use of a capacitor allows for the construction of a very small device.

Furthermore, the use of such a capacitor can significantly reduce the amount of power required for determining the displacement with respect to the device known from European patent application EP-A-0637734, because measuring resistance requires more electrical current than measuring capacitance. As a result, less temperature variations may occur in the device according to the invention than in the device known from European patent application EP-A-0637734. Therefore, it is easier to compensate for these temperature variations, simply because they are smaller than the temperature variations in the known device.

In an advanced embodiment of the device according to the invention, the device is arranged for wireless power supply and/or wireless data transfer. An advantage of the application of a capacitor in the determination of a change in the distance is the low power consumption which allows for such wireless power supply and/or wireless data transfer. Such a wireless arrangement allows for free movement of the bearing roller.

To prevent an undesired angular deformation, the device has a symmetry plane perpendicular to the plate.

Furthermore, in a preferred embodiment of the invention the device is associated with at least one probe for making contact with an external body, such as the inner bore wall of the bearing roller. The displacements can be "picked up" by the probe.

The probe may simply be formed by a cam for making a sliding contact with the external body and the cam may comprise a well-polishable material, for instance a metal, such as stainless steel. In addition or as an alternative, the cam may comprise a suitable mineral, for instance diamond, ruby or sapphire. Roughness of the cam can be minimised so that roughness of the cam does not result in unwanted variations in the capacitance of the capacitor, during use of the device. Such a probe can be arranged to maintain a constant angle between the capacitor electrodes, which has the advantageous effect that any change in capacitance cannot be a result of variations of this angle. This allows for a straightforward, for instance linear, correlation between a distance between two external bodies and a change in the capacitance of the capacitor.

In a preferred embodiment according to the invention, the electrodes are plate-shaped, which has the advantage that the electrodes can have a large contact surface with the plates.

In the following, the invention will be described in greater detail with reference to the embodiment shown in the enclosed drawing. In the figures of the drawing, like parts have like references.

Figure 1:
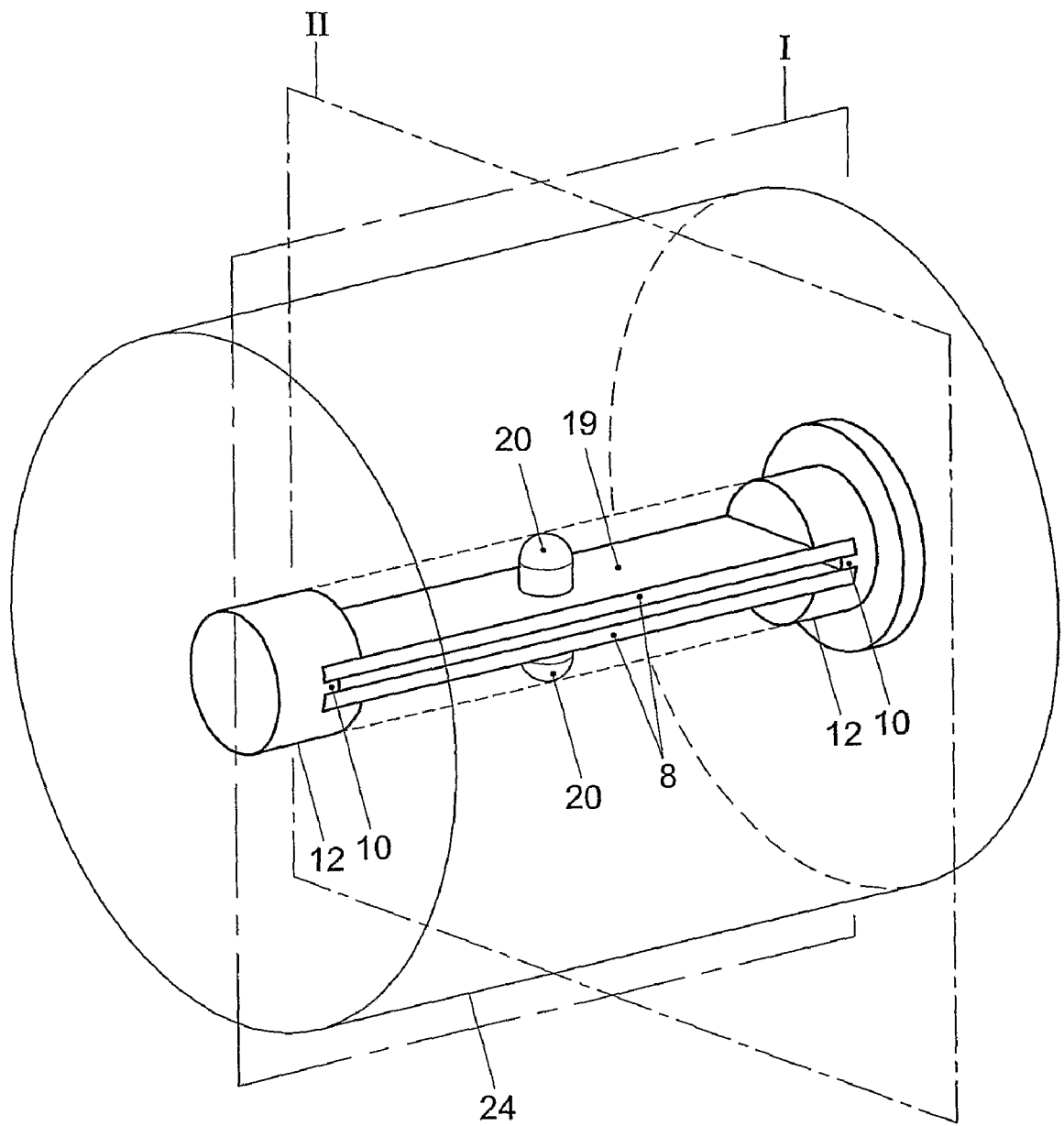
FIG. 1 is a perspective view of a bearing roller in which an embodiment of the device according to the invention is inserted for measuring deformation of the bearing roller.
Figure 2:
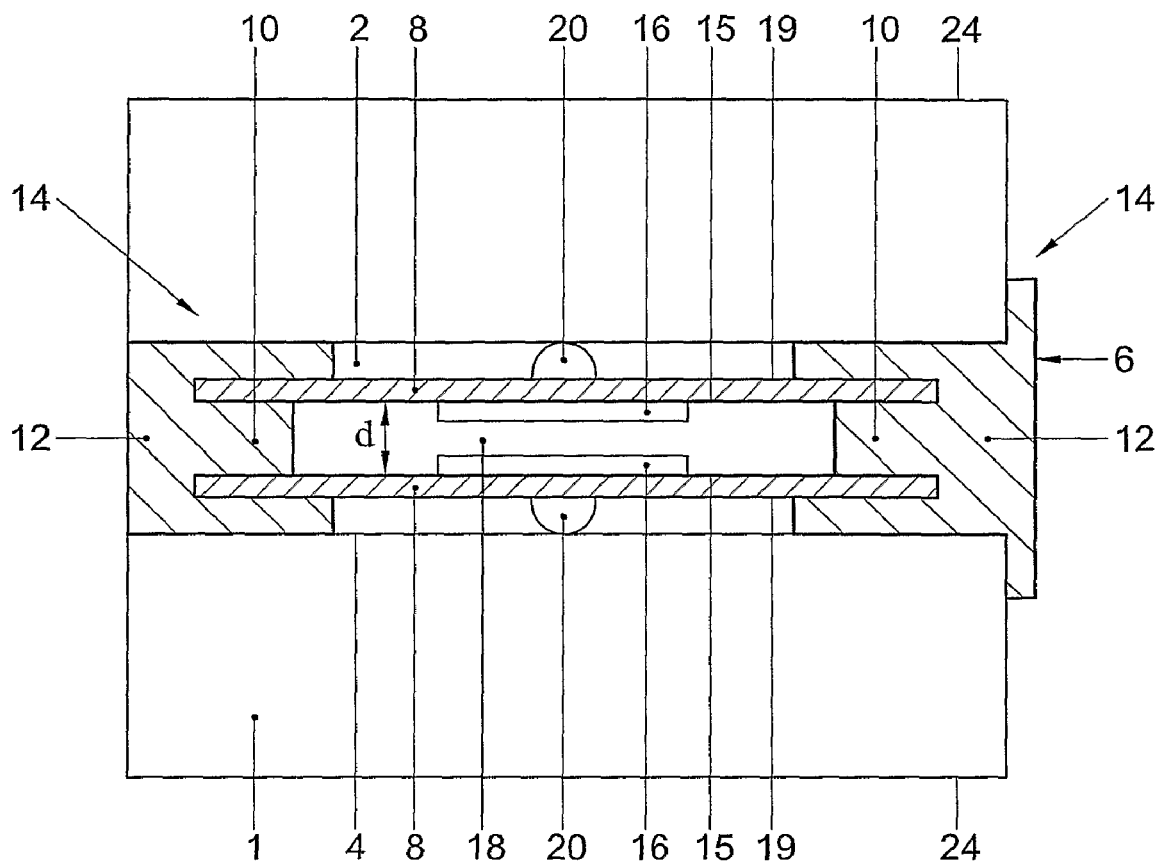
FIG. 2 is a sectional view of the device showing FIG. 1 as cross-sectioned along plane I.
Figure 3A:
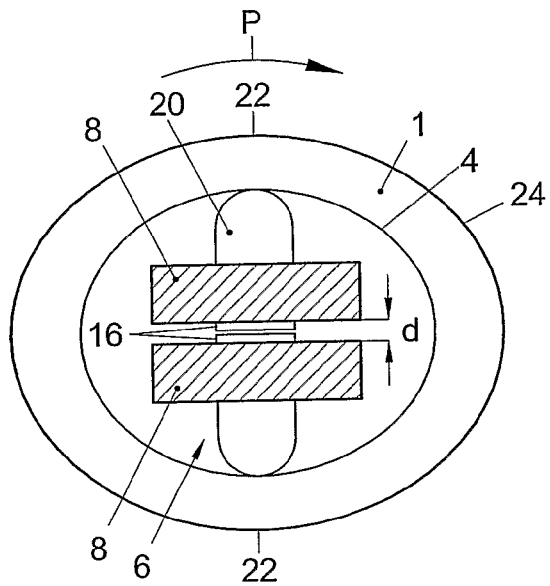
Figure 3B:
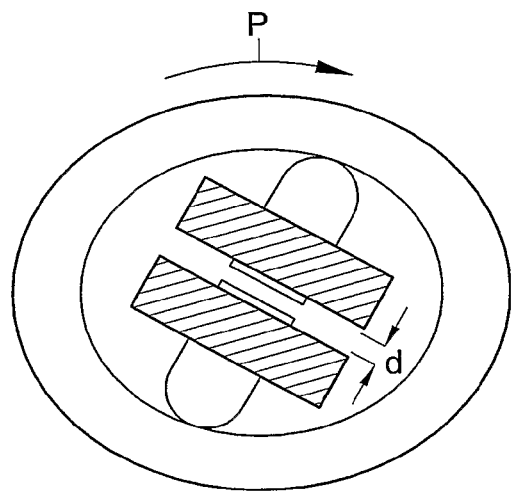
Figure 3C:
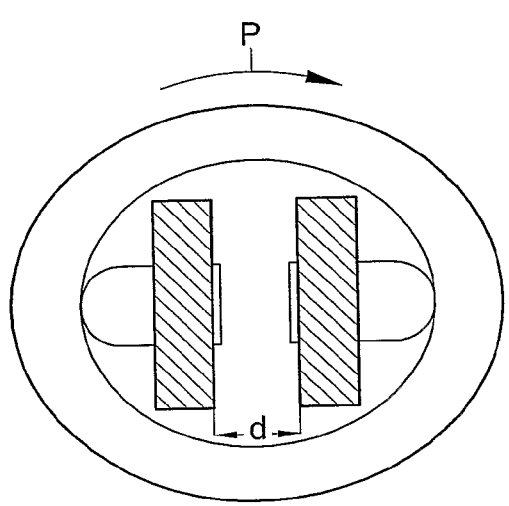
Figure 3D:
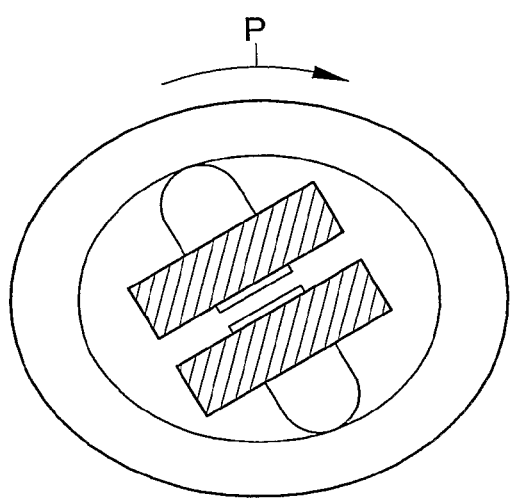
Figure 3E:
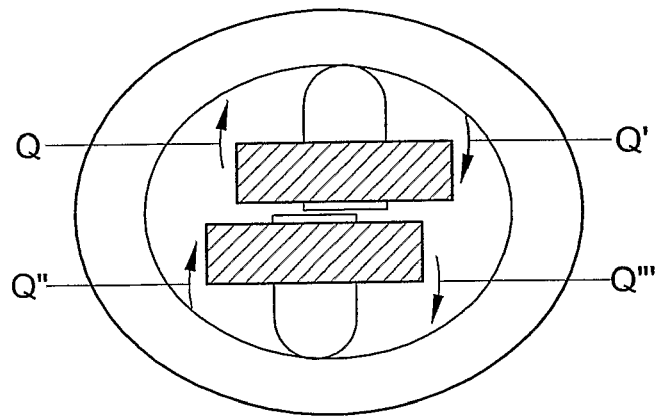
Figure 3F:
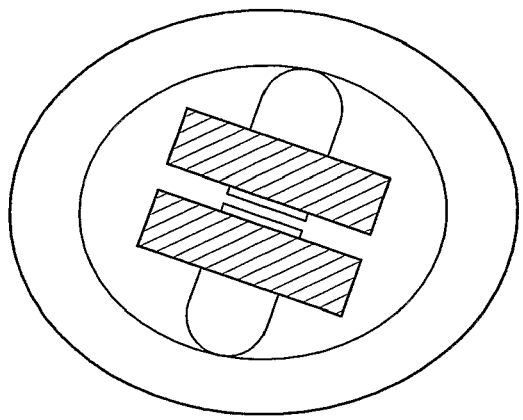
Figure 3G:
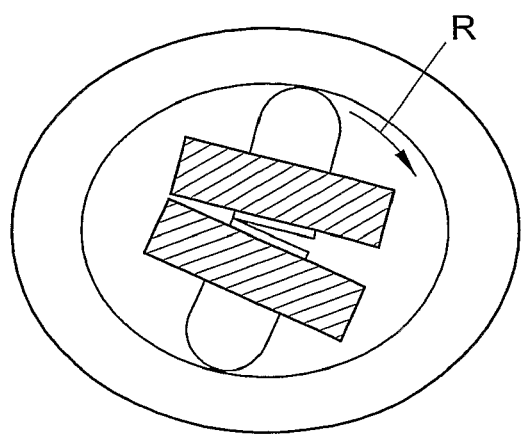
Figure 4:
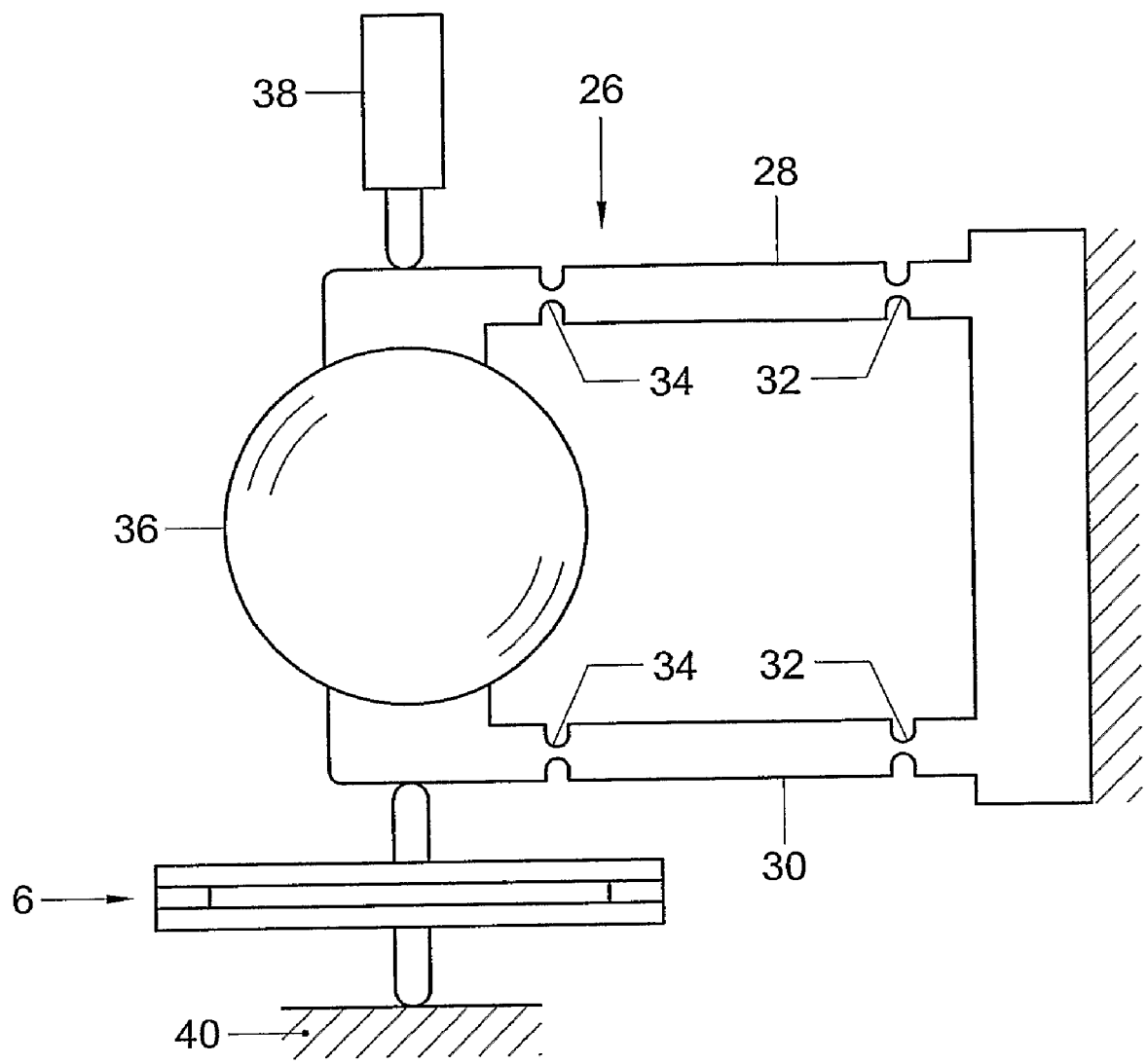

FIGS. 3a-g are sectional views of the device shown in FIG. 1 as cross-sectioned along the plane II during rotation of the bearing roller; and FIG. 4 is a side view of a suspension in which the embodiment of the device shown in FIGS. 1-3 is applied.

FIG. 1 is a perspective view of a bearing roller 1 which comprises a bore 2. Such a bearing roller 1 can be used as part of a roller bearing (not shown in the drawing). The bore 2 has an inner bore wall 4. The bore 2 is provided with an embodiment of the device 6 according to the invention. In this embodiment, the device 6 comprises two substantially parallel plates 8 between which a distance d is maintained by spacers 10 which are, in this embodiment, each part of an end unit 12. The plates 8 are each substantially formed by a printed circuit board. The printed circuit board may be made of an epoxy glass fibre reinforced laminate, preferably a flame retardent, such as flame retardent 4 (FR4), aluminum oxide, aluminum nitride, Rogers 4003, Rogers Duroid, a low temperature co-fired ceramic material (LTCC) and/or a high temperature co-fired ceramic material (HTCC). A glass, for instance quartz or a borosilicate glass, is not to be considered a printed circuit board material. The end units 12 are each shaped to fit into end parts 14 of the bore 2. Furthermore, an inner side 15 of each of the plates 8 is provided with a plate-shaped electrode 16 (see FIGS. 2 and 3). The two plate-shaped electrodes 16 together form a capacitor 18. The electrodes 16 of the capacitor 18 on the inner sides 15 of the respective plates 8 can each be formed as a layer of nickel with gold on top of it and can, for instance, be formed by vaporising first nickel and secondly gold. Each of the plates 8 supports one of the electrodes 16. The electrode 16 on the plate 8 may be produced by firstly providing the plate 8 which is on at least the side 16 thereof substantially fully metalised, e.g. with first nickel and then gold, and secondly selectively etching the metalised layer so that the electrode 16, and optionally at least one electrically conducting path, e.g. connected to the electrode 16, remains.

Optionally, electronic components (not shown in the figures) can be provided on one or both of the plates 8, e.g. on outer sides 19 of the respective plates 8. Such components may be connected to the plates by way of stud bumping and flip chipping both of which are methods known by a person skilled in the art. An electrical connection can be formed between an electrode 16 and the electronics, e.g. an electronic component or electrically conducting path, applied on the other side 19 of the plate 8 via for instance a channel that extends through the plate from the inner side 15 to the outer side 19. In this channel, an electrically conductive material may be applied. Preferably, these channels (not shown in the drawing) are located away from a central part of the plate so as to not influence the bending properties of the plates 8.

In a special embodiment, a reference capacitor is arranged on at least one of the plates 8. The reference capacitor may e.g. be a surface mounted device (SMD) and may be electrically connected to electrically conducting paths which extend over a surface of the plate 8. The reference capacitor may e.g. be used to compensate for temperature changes. Preferably the reference capacitor is arranged close to the electrode 16, e.g. spatially overlapping with the electrode, on the opposite side 19 of the plate 8.

In another special embodiment, a signal processor and/or signal conditioner, such as a signal amplifier, is arranged on at least one of the plates 8. The signal processor and/or signal conditioner may e.g. be a surface mounted device (SMD) and may be electrically connected to electrically conducting paths which extend over a surface of the plate 8, i.e. the printed circuit board. The reference signal processor and/or signal conditioner may e.g. be used to convert electronic charge changes in the electrode 16 into a measurement signal. Preferably the signal processor and/or signal conditioner is arranged close to the electrode 16, e.g. spatially overlapping with the electrode, on the opposite side 19 of the plate 8.

Each plate 8 has a probe 20 on a side of the plate that is opposite the side to which the electrode 16 is applied. In this embodiment, the probe is provided with a cam 20. The cam 20 has a curved surface and is made of a well-polishable material. Such a material could be stainless steel or a suitable mineral, such as diamond, ruby or sapphire. In this embodiment of the device 6, the cam 20 is capable of making a sliding contact with the inner bore wall 4.

As shown in the figures, in use, the device 6 is placed in the bore 2 of a bearing roller 1 of a roller bearing under a pre-applied compressive stress, so that deformation due to compression (FIG. 3a) as well as expansion (FIG. 3c) is determinable. It will be clear that the bearing roller is placed between two surfaces (not shown in the figures), between which movability in a direction parallel to these surfaces is to be enhanced, a force is exerted on the individual rollers at certain points 22 on a bearing roller surface 24. As a result of this force, the bearing rollers 1 are deformed.

FIGS. 3a-g show the bearing roller 1 in a deformed state. It is to be understood that the proportions and the deformation of the bearing roller as shown in FIG. 5a-g are for explanatory reasons exaggerated. In reality, the diameter of the bore 2 is much smaller relative to the diameter of the bearing roller and the deformation of the bearing roller 1 is much smaller than the deformation as shown in FIGS. 3a-g. For the sake of clarity, however, both the deformation and the proportions mentioned above have been exaggerated.

It is noted that the embodiment of the device is symmetrical with a symmetry surface perpendicular to the inner and outer sides 15, 19 of the plate-shaped plates and intersecting the device at the location of the probes and the capacitor electrodes.

The embodiment of the device according to the invention works as follows.

When the bearing roller 1 is deformed, the distance d between the plates 8 as well the electrodes 16 attached thereto a displacement of two predetermined parts of each of the plates 8 occurs as a result of this deformation. As the capacitance of the capacitor 17 increases when the distance between the electrodes 16 decreases, the distance between the electrodes 16 and thus the deformation of the bearing roller 1 can be deduced from the capacitance.

During the distance measurement, the plates 8 of the device 6 act as guiding means for the electrodes 16. The plates 8 allow for a displacement of the electrodes 16 with respect to each other, the displacement being in substantially perpendicular to a main surface of the plate-shaped electrodes.

When the inner bore wall surfaces between which the bearing roller 1 is placed, move relative to each other, the bearing roller 1 is rolled relative to the surfaces and the device 6 rotates along with the bearing roller 1. As during the movement of the surfaces different parts of the bearing roller 1 are deformed and the device 6 rotates along with the bearing roller 1, the device 6 measures the periodically varying distance d, as shown in FIGS. 3a-d. In this example, the minimum distance is chosen as a starting point (FIG. 3a). As the bearing roller 1 and the device 6 rotate in the direction of the arrow P, the distance increases (see FIG. 8b) until it arrives at the maximum, as shown in FIG. 3c. Hereafter, the measured distance decreases (see FIG. 3d), until the minimum distance as shown in FIG. 3a is measured again. From the measured distance, the deformation of the bearing roller 1 can be determined.

During rotation of the bearing roller 1, the probes 20 of the device 6 may move slightly relative to each other due to the deformed state of the inner bore wall 4 (see FIG. 3e). As shown in FIG. 3e, this may cause the electrodes 16 to deviate from their desired orientation in which the electrodes 16 fully face each other. As a result of the curved surface of at least one of the probes 20, the probes 20 will roll along the inner bore wall 4 in the directions indicated by the arrows Q, Q', Q" and Q''' in FIG. 3e when such a deviation occurs, so that the desired orientation is recovered (see FIG. 3f).

Note that the illustrations in FIGS. 3e and 3f have been exaggerated for the sale of clarity. In practice, such deviations will not, at least preferably not, occur on the large scale illustrated in FIG. 3e, because the probes 20 will roll almost immediately when the electrodes 16 do not face each other. Therefore, any such deviations will be within acceptable limits, meaning that the deviations will not significantly affect measurement quality.

Also, due to imperfections in the inner bore wall 4, the plates 8 could deviate from the desired parallel orientation relative to each other, of which an exaggerated case is shown in FIG. 3g. In this case, the well-polished curved surface of the probe 20 will slide with respect to the inner bore wall 4 in the direction of the arrow R to return to the desired orientation as shown in FIG. 3f.

In this embodiment, the device is arranged for wireless power supply and/or data transfer. Thereto, the device comprises an energy receiver (not shown) for wirelessly receiving energy, e.g. for receiving radio frequent radiation. Further, the device comprises a data receiver and data transmitter for wirelessly receiving and transmitting data, respectively. It will be appreciated that at least some of the electrical components constituting the energy receiver, data receiver and/or data transmitter may be arranged on one or both of the plates 8, i.e. on one or both of the printed circuit boards. This allows for compact construction of the device. An external signal is sent to the device 6 by an external data storage system (not shown in the figures). The distance d is measured and subsequently a measurement value representing the distance d is sent back to the data storage system.

FIG. 4 shows an optical suspension 26 having two arms 28, 80, i.e. a top arm 28 and a bottom arm 30, each of the arms 28, 30 having two hinges 32, 34 so that the arms are arranged to guide an optical element, such as a lens 36 that is mounted there between for a translational, in FIG. 4 vertical, movement. Furthermore, an actuator 38 is provided for adjusting the position of the optical element. To this end, the actuator 38 abuts the top arm 28. To measure the vertical movement of the optical element, the probes 20 of the device 6 is positioned between the bottom arm 30 and an external body 40 relative to which vertical the movement of the optical element is defined.

It will be apparent to the skilled person that the invention is not limited to the embodiment of the device as described above. The shape of the bore for which the device according to the invention is designed need not have a cylindrical shape. Furthermore, it is possible to arrange a data processor and/or data storage unit in the device. The data processor may be configured to calculate the displacement from a signal output by the sensor. The data storage unit may be arranged to store the measured signals and/or calculated displacements, e.g. as a function of time. It will be appreciated that at least some of the electrical components constituting the data processor and/or data storage unit may be arranged on one or both of the plates. The relevant data can, if so desired, be extracted from the devices after the measurements have been completed.

The invention claimed is:

1. Device for determining displacement, the device comprising at least two substantially parallel plates located at a distance from each other, the device being arranged to determine a displacement of at least two predetermined parts of each of the plates with respect to each other, the displacement being directed substantially perpendicular to a main surface of the plates and the displacement being a result of bending of the plates, wherein the device comprises at least one sensor for measuring the displacement, wherein at least one of the plates is substantially formed by a printed circuit board.

2. Device according to claim 1, characterised in that the printed circuit board is of the type whereon usually electronic components are mounted and electronically connected by means of electronically conducting paths of the printed circuit board.

3. Device according to claim 1, characterised in that the sensor is formed by a capacitor having at least two capacitor electrodes, each of the plates being provided with such a capacitor electrode, wherein the displacement between the plates is determinable on the basis of a change in the capacitance of the capacitor.

4. Device according to claim 1, characterised in that the device has a symmetry plane substantially perpendicular to the plates.

5. Device according to claim 1, characterised in that the printed circuit board is substantially formed of an epoxy glass fibre reinforced laminate, preferably a flame retardent material, such as flame retardent.

6. Device according to claim 1, characterised in that the printed circuit board is substantially formed of aluminum oxide, aluminum nitride, Rogers 4003, Rogers Duroid, a low temperature co-fired ceramic material and/or a high temperature co-fired ceramic material.

7. Device according to claim 1, characterised in that the device is associated with at least one probe for making contact with an external body.

8. Device according to claim 1, characterised in that the device is provided with a signal processor and/or signal conditioner for processing and/or conditioning a measurement signal of the sensor.

9. Device according to claim 1, characterised in that the device is provided with a data processor on or near one of the plates, the data processor being configured to calculate the displacement from a sensor exit signal.

10. Device according to claim 1, characterised in that the device is provided with a data storage unit on or near one of the plates, for storing measured values.

11. Device according to claim 1, characterised in that the device comprises an energy receiver for wireless power supply and/or a data receiver and/or data transmitter for wireless data transfer.

12. Device according to claim 1, characterised in that at least one electronic component is provided on the at least one printed circuit board plate.

13. Use of a device according to claim 1 for determining displacement.

14. Suspension provided with a device according to claim 1.

15. Adjustment device provided with a device according to claim 1.

16. Bearing roller comprising a bore, the bore being provided with a device according to claim 1.

17. Device according to claim 3, characterised in that the electrode on the at least one plate of printed circuit board material has been obtained by etching the initially substantially fully metalised plated.

18. Device according to claim 3, characterised in that the electrodes are plate-shaped.

19. Device according to claim 3, characterised in that the device comprises at least one spacer for maintaining the distance between the capacitor electrodes.

20. Device according to claim 3, characterised in that the device is provided with a reference capacitor on the at least one printed circuit board plate, for e.g. compensating for changes in capacitance between the electrodes due to temperature changes.

21. Device according to claim 7, characterised in that the at least one probe is arranged to maintain a constant angle between the capacitor electrodes.

22. Device according to claim 7, characterised in that the probe is provided with a cam for making a sliding contact with the external body.

23. Device according to claim 12, characterised in that at least some of the electrical components constituting the data processor, data storage unit, energy receiver, data receiver and/or data transmitter are be arranged on the at least one printed circuit board plates.

24. Suspension according to claim 14, wherein the suspension is a lens suspension.

25. Device according to claim 22, characterised in that the cam is provided with a curved surface for making the sliding contact with the external body.

26. Device according to claim 22, characterised in that the cam comprises a well-polishable material.

27. Suspension according to claim 24, wherein the suspension is arranged for allowing for substantially translational displacement of the lens.

28. Device according to claim 26, characterised in that the well-polishable material comprises a metal, for instance stainless steel.

29. Device according to claim 26, characterised in that the well-polishable material comprises a suitable mineral, for instance diamond, ruby or sapphire.

* * * * *